United States Patent [19]

Rudish et al.

[11] Patent Number: 4,839,894
[45] Date of Patent: Jun. 13, 1989

[54] CONTIGUOUS CHANNEL MULTIPLEXER/DEMULTIPLEXER

[75] Inventors: Ronald M. Rudish, Commack; Scott F. Hall, Plainview, both of N.Y.

[73] Assignee: Eaton Corporation, Cleveland, Ohio

[21] Appl. No.: 910,098

[22] Filed: Sep. 22, 1986

[51] Int. Cl.$^4$ .............................................. H04B 9/00
[52] U.S. Cl. ...................................... 370/123; 333/126; 333/135; 342/196; 364/726; 364/827; 370/70
[58] Field of Search ................... 370/70, 123; 364/724, 364/726, 825, 827; 333/126, 127, 128, 132, 134, 135, 136, 137; 342/196

[56] References Cited

U.S. PATENT DOCUMENTS

| | | | |
|---|---|---|---|
| 3,710,281 | 1/1973 | Thomas | 333/134 |
| 3,971,922 | 7/1976 | Bellanger et al. | 370/70 |
| 4,652,879 | 3/1987 | Rudish et al. | 342/371 |

OTHER PUBLICATIONS

Takahata et al—Development of a TDM/FDM Transmultiplexer—IEEE Trans. on Comm., vol. COM-26, #5, May 1978, pp. 726–733.

Primary Examiner—Robert L. Griffin
Assistant Examiner—Leslie Van Beek
Attorney, Agent, or Firm—V. J. Ranucci

[57] ABSTRACT

A multiplexer/demultiplexer for combining/separating a large number of contiguous frequency channels in microwave bands while incurring low insertion loss. The invention, in a demultiplexer mode, includes a power divider, to form a multiplicity of samples of an input signal; delay lines to non-dispersively differentially delay the samples in accordance with a first arithmetic progression; phase shifters to add fixed phase shifts to samples in accordance with a second arithmetic progression; and a Butler matrix to coherently combine the samples selectively at different output ports for different input signal frequencies. In a multiplexer mode, input signals are applied to the Butler matrix. The Butler matrix, phase shifters, delay lines, and power divider perform in reverse of the demultiplexer mode (the power divider thus performing as a power combiner). The present invention minimizes insertion loss by eliminating any requirement for resonators and any means for isolating resonators.

12 Claims, 3 Drawing Sheets

CONTIGUOUS CHANNEL MULTIPLEXER/DEMULTIPLEXER

BACKGROUND OF THE INVENTION

1. Field of the Invention

This invention relates to electric-wave filters, and more particularly, to improvements in the art of contiguous frequency-channel separation multiplexers/demultiplexers.

2. Description of Related Art

Electric-wave filters are often configured for the purpose of separating contiguous frequency-channels (demultiplexing) or for the purpose of combining such channels (multiplexing or multicoupling). For demultiplexing, a single wide-bandwidth composite input signal is split into multiple narrower-bandwidth component output signals, each capable of following separate signal-flow paths. Conversely, for multiplexing, multiple input signals, each occupying a different frequency channel, are efficiently combined so that they may flow together on a single output path as a wider-bandwidth composite signal. Typically a frequency filter which accomplishes demultiplexing uses reciprocal components, thereby allowing the same filter to perform multiplexing by simply reversing the direction of signal flow. Examples of such application are frequency multiplexers and demultiplexers used at each end of a single coaxial-cable communication link to enable the link to simultaneously carry many communication channels. Frequency demultiplexers are also used in channelized receivers to separate signals of different frequency so that the signals can be further processed by parallel circuity.

The prior art provides effective means for multiplexing or demultiplexing when the number of channels is small. Reference is made particularly to both parallel-connected and series-connected multiplexers described by Matthaei, Young and Jones in Chapter 16 of their book *Microwave Filters, Impedance-Matching Networks, and Coupling Structures* (Artech House, Inc., Dedham, MA, 1980). However, the prior art is not efficient or effective in cases where the number of channels is large because of the large number of filters that are required, and the steps that are necessary for eliminating interactions between the filters.

One example of a prior art method for implementing a multiplexer/demultiplexer with many channels is shown by the block diagram in FIG. 1 wherein a multiplexer/demultiplexer is depicted as a series cascade of multiple sections, each section including a branching filter 102 (104, 106, 108) and a series isolator 101 (103, 105,107). The branching filter 102 typically consists of multiple coupled resonators, tuned to pass signals within the frequency band of the channel being branched. The isolator 101 is any one of a variety of devices, for example, a ferrite non-reciprocal type or an active non-reciprocal type such as an amplifier (both examples being applicable to multiplexing or demultiplexing but not both simultaneously), a frequency-selective filter type, or a quadrature hybrid type in a balanced configuration. The purpose of the isolator is to reduce impedance interactions and thus prevent the detuning of each branching filter by the presence of the other branching filters. A major disadvantage of this approach is that the channels at the far end of the cascade suffer the sum of the insertion losses of each preceding section.

Another prior art demultiplexer is also formed as a series cascade. However, in this case directional filters which have constant resistance input impedances are cascaded so that additional isolation devices are not required. Nevertheless, the insertion loss of each directional filter is significant such that channels near the end of the cascade suffer high insertion loss. Additionally, it is difficult to tune the resonators within each directional filter because of the simultaneous presence of orthogonal modes.

Another example of a prior-art method for implementing a multiplexer/demultiplexer with many channels is shown by the block diagram in FIG. 2 wherein a demultiplexer is depicted as a corporate network of binary band-splitters 201, 202, 203, 204, 205. Each band-splitter is a diplexing pair of filters which are matched to the transmission lines at input and outputs by virtue of complementary impedance design or by use of separate means of impedance isolation. Each band-splitter passes an input signal to the left or to the right outputs depending on whether the signal frequency is in the lower or upper portion of the frequency band assigned to that band-splitter. Frequency bands are assigned in accordance with the position of the band-splitter within the demultiplexer. For example, the band-splitter 201 at the input level must cover the whole band of interest, while the two band-splitters 202 and 203 at the next level each cover complementary halves of the band of interest (actually each is arranged to cover slightly more than half the band so that its passband extends beyond the crossover frequency of the previous band-splitter; this staggering of passband edges avoids the high insertion loss that would otherwise result at certain channel edges if each band-splitter's bandwidth were a binary multiple of the channelwidth). This corporate type architecture has an advantage over the series cascade architecture in that the sum of the insertion losses in the corporate case is the same for each channel and is appreciably lower than the average loss in the cascade architecture for the same number of channels. Nevertheless, the insertion loss of the corporate-type architecture may be higher than desirable if each bandsplitter has even moderate insertion loss. Achieving low insertion loss in each band-splitter requires that the resonators, which comprise the band-splitter, have a very high Q-factor; this in turn requires that the resonators be of large physical size. Thus the requirement for this prior art demultiplexer to have low insertion loss is coupled with the disadvantage that its size must be large.

SUMMARY OF THE INVENTION

An object of the present invention is to provide a demultiplexer for separating a composite signal into separate constituents and directing them to separate paths based on their individual frequencies.

An object of the present invention is to provide a multiplexer for combining separate constituent signals and directing them on a single path.

An object of the present invention is to provide a frequency channelizer for directing a signal applied at its input to one of its many output ports, the specific output port being determined by the frequency of the signal applied to the input.

An object of the present invention is to achieve all the objectives stated above with an approach that is suitable for implementation at microwave and millimeter wavelengths.

An object of the present invention is to achieve all the objectives stated above with less insertion loss than prior art devices of similar size.

The present invention overcomes the deficiencies of the prior art devices by eliminating any requirement for resonators or other frequency-band-limited components.

The present invention achieves frequency selectivity by phase cancellation rather than resonant circuits. The invention applies the principle of a transversal filter in a novel arrangement which permits a single input to be branched to multiple outputs (for demultiplexing), and which permits multiple inputs to be combined to a composite output (for multiplexing). The classical transversal filter is a two-port device with a single input and single output; its purpose is to modify the spectral characteristics of a signal applied to its input rather than to split that signal into constituent channels.

In the present invention, functioning as a demultiplexer, a composite signal applied to the input is split into multiple parts by a power divider, each part then being delayed differentially with respect to the other parts, the delay causing differential phase shifts, the magnitudes of the phase shifts being frequency dependent. Then each part is applied to a phase shift network for an additional phase shift which is independent of frequency. Next, all the parts are summed by a multiple-input, multiple-output device which is commonly known as a Butler matrix. Due to the differential phase shifts imparted by the delays and the nature of the Butler matrix, all parts of a constituent signal will constructively sum at a particular output port of the Butler matrix and destructively sum at all other output ports. Constituent signals of different frequency will constructively sum at different output ports of the Butler matrix due to different relative phasing of their parts. Functioning as a multiplexer, the present invention works in reverse of a demultiplexer when input signals are applied to the Butler matrix.

Each component of the present invention is a nonresonant device with frequency passbands as wide as the full input bandwidth. Thus, the usual filter tradeoff between resonator size and Q-factor does not apply to the present invention and indeed does not determine the size or the insertion loss of the invention.

DETAILED DESCRIPTION OF THE INVENTION

Figure 1:
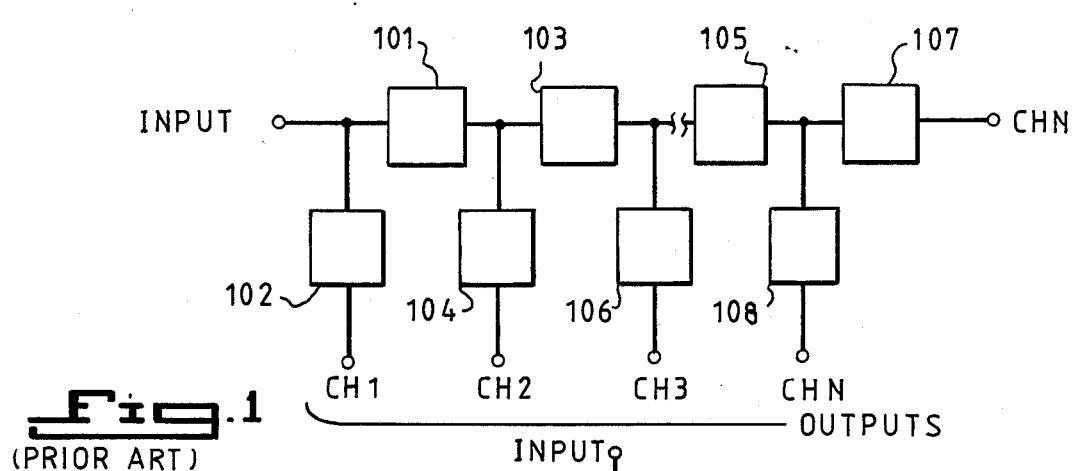
FIG. 1 is a diagram of a prior art multiplexer/demultiplexer based on a series cascade approach.
Figure 2:
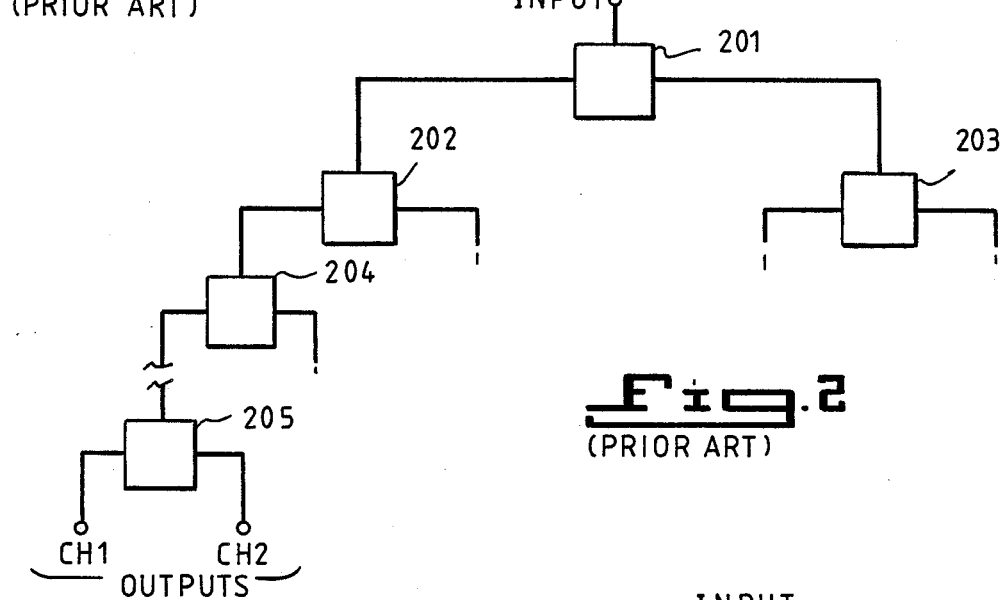
FIG. 2 is a diagram of a prior art multiplexer/demultiplexer based on a corporate binary splitter approach.
Figure 3:
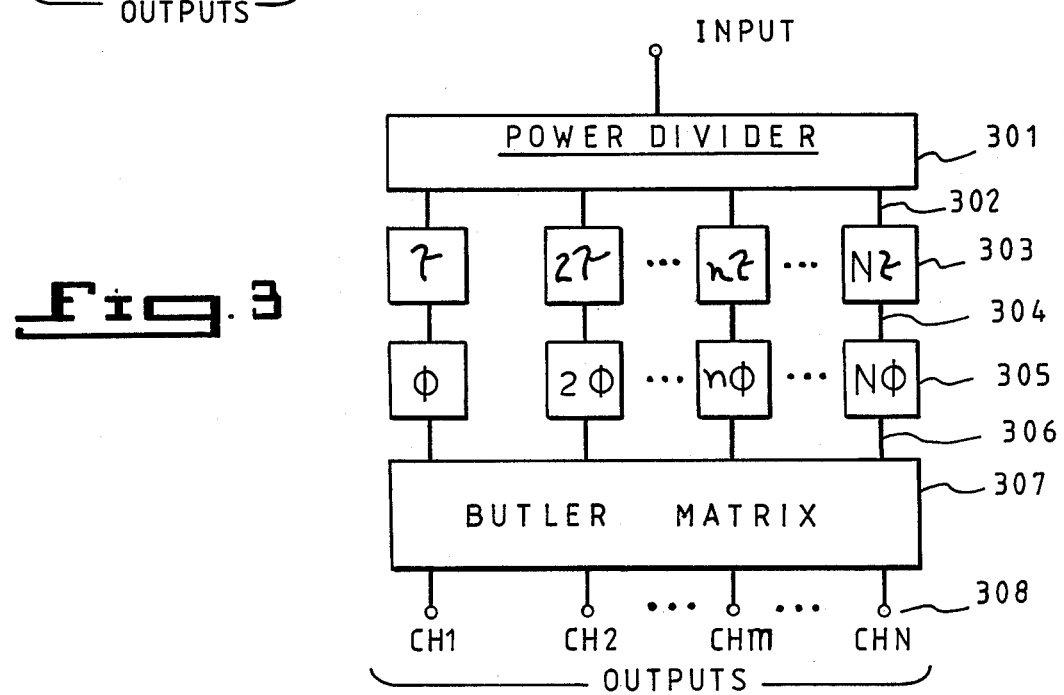
FIG. 3 is a diagram of a multiplexer/demultiplexer illustrating a first embodiment of the present invention.

To clearly illustrate the various novel aspects of the invention, a specific example of the invention operating as a demultiplexer is taken in which a CW input signal at radian frequency $\omega$ is applied to the input port of an N channel demultiplexer incorporating the preferred embodiment of this invention. The preferred embodiment is shown in FIG. 3. The block diagram of FIG. 3 consists of a power divider 301 having N output ports, a set of N equal length transmission lines 302 which connect the N output ports of power divider 301 with a set of N delay lines 303 of progressively differing (monotonically increasing or decreasing) delay, a second set of N equal length transmission lines 304 which connect the delay lines 303 to a set of fixed phase-shift networks 305, a third set of equal length transmission lines 306 which connect the fixed phase-shift networks 305 to a Butler matrix 307, the Butler matrix having N output ports 308. The Butler matrix may be any type commonly known in the art, as, for example, described in J. Butler and R. Lowe, "Beam Forming Matrix Simplifies Design of Electronically Scanned Antennas", Electronic Design, Volume 9, P. 170–173, 1961. Operating as a multiplexer, the power divider performs as a power combiner. Such power divider/combiner is commonly known in the art.

The following is a detailed description of how the components of FIG. 3 function as a demultiplexer to route an input signal to different output ports depending on the frequency of the input signal.

The power divider 301 divides the input signal into N equiphase samples. An nth sample, where n is any sample, can be expressed as:

$$e_n = A_n \cos \omega t.$$

Each sample is delayed by a delay line 303 which provides a delay $T_n$, relative to the other samples, in accordance with a first arithmetic progression:

$$T_n = (n - \bar{n})\left(\frac{1}{N\Delta f}\right)$$

where $\bar{n} = (N+1)/2$, and where $\Delta f$ is a desired channel separation bandwidth of the demultiplexer. The delay lines are nondispersive and provide phase shifts, $\phi_{Dn}$ which vary linearly with frequency in accordance with the formula:

$$\phi_{Dn} = -(n - \bar{n})\left(\frac{\omega}{N\Delta f}\right).$$

Delay lines constructed as simple lengths of TEM transmission lines will exhibit such phase properties. As a result, the nth delayed sample can be expressed as:

$$e_{nD} = A_n \cos\left[\omega t - (n - \bar{n})\left(\frac{\omega}{N\Delta f}\right)\right].$$

The samples are then applied to phase-shift networks 305 where each sample is given an additional phase shift, relative to the other samples, which is independent of the frequency of the input signal and is in accordance with a second arithmetic progression:

$$\phi_{pn} = C(n - \bar{n}) \frac{2\pi}{N}$$

where C=the fractional part of the numerical quantity $(\bar{n}+f_1/\Delta f)$ and $f_1$=the center frequency of the lowest frequency channel. Such phase shift devices may be constructed as electromagnetically-coupled transmission lines or as stub-loaded transmission lines, as is common practice in the microwave engineering art. As a result of these phase shifts, the nth delayed and phase shifted sample can be expressed as:

$$e_{np} = A_n \cos\left[\omega t - (n - \bar{n})\left(\frac{\omega}{N\Delta f} - \frac{2\pi C}{N}\right)\right].$$

N signals of this form are applied to the inputs of the Butler matrix 307. The Butler matrix divides the signal at its nth input into N equal parts, phase shifts each by an amount $\phi_{nm}$, where m is any output of the Butler matrix, and combines each with signal parts which originated from other input ports to form the sum $e_m$ at its mth output port 308. The phase shift, $\phi_{nm}$ is dependent on both m and n and is given by:

$$\phi_{nm} = (n - \bar{n})(m - \bar{n})\frac{2\pi}{N}.$$

Thus the output voltage, $e_m$ is the summation:

$$e_m = \frac{1}{\sqrt{N}} \sum_{n=1}^{n=N} A_n \cos\left(\omega t - (n - \bar{n})\left[\frac{\omega}{N\Delta f} - \frac{2\pi}{N}(C + m - \bar{n})\right]\right)$$

where the $\sqrt{N}$ factor accounts for the N-way power division in the Butler matrix. To facilitate further illustrations, it will temporarily be assumed that $A_n=1$ (uniform power division by power divider 301). Then it can be shown that the summation equates to:

$$e_m = \frac{E_f}{\sqrt{N}} \cos \omega t$$

where $$E_f = \frac{\sin \frac{1}{2}NZ}{\sin \frac{1}{2}Z}$$

and $$Z = \frac{\omega}{N\Delta f} - \frac{2\pi}{N}(C + m - \bar{n}).$$

Figure 4:
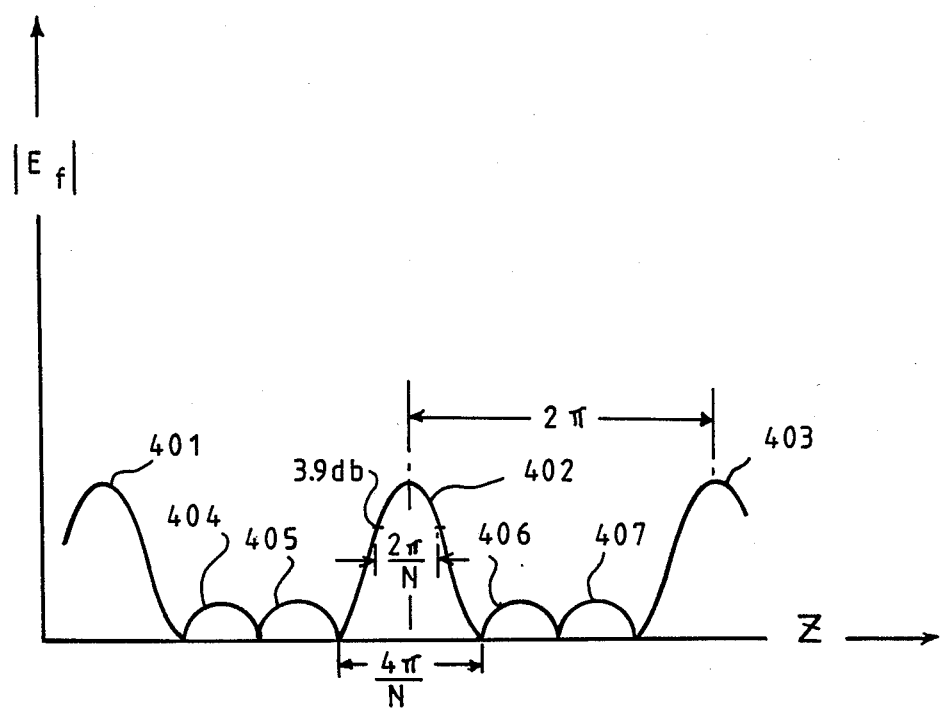
FIG. 4 is a graph illustrating the frequency response of a single output of the present invention in a particular application.

Thus the function $e_m$ is the product of a carrier term and $E_f$, a frequency response term. The magnitude of this frequency response term, $|E_f|$ is plotted for the case of N=4 in FIG. 4 against the composite variable Z which is linearly dependent on $\omega$. The frequency response is plotted for a range of Z of $4\pi$ centered about $Z(f_1)$. The graph expresses the multiple bandpass filter action of the delay-and-add operations performed by the delay lines and the Butler matrix. Shown within the range of abscissa plotted in FIG. 4 are a mainlobe 402 and two grating lobes 401 and 403 of the frequency response term which constitute passbands and four sidelobes 404, 405, 406 and 407 of the response term which fill two reject bands. In a practical system where rejection band responses must be strongly suppressed, these sidelobes can be suppressed by amplitude tapering of the signals applied to the Butler matrix, that is, by choosing the coefficients $A_n$ in accordance with one of the distributions commonly used in the art of antenna array design to provide suppressed antenna pattern sidelobes. The tapering operation to control frequency sidelobes can be applied by the power divider 301 (unequal division). Alternatively, tapering can be achieved by placing unequal attenuation or gain elements in cascade with the delay lines 303.

The filtering implied by the frequency response plotted in FIG. 4 is a result of phase cancellations rather than the frequency responses of the components (which are wideband). The width of each passband measured between nulls is $4\pi/N$ in terms of Z which translates to $4\pi\Delta f$ in terms of $\omega$. The width measured between points that are 3.9 dB down on the frequency envelope is $2\pi/N$ in terms of Z which translates to $2\pi\Delta f$ in terms of $\omega$. The separation of the passbands is $2\pi$ in terms of Z which translates to $2\pi\Delta fN$ in terms of $\omega$.

An incident signal whose frequency is such that the signal does not cause peak response at a particular port of the Butler matrix will also be received at one or more additional ports. Indeed, the N outputs of this Butler matrix have the staggered frequency responses represented by the frequency response magnitudes plotted in FIG. 5 for the case where N=4. Four curves are plotted using different line codes, one for each of the four outputs. Only the mainlobes 501, 502, 503, 504, and grating lobes 505, 506, 507, 508, 509 and 510 are shown; the sidelobes have been suppressed for purposes of clarity. Adjacent mainlobes are spaced apart by $2\pi/N$ in terms of Z and therefore cross-over at points that are 3.9 dB down from the mainlobe peaks (for the case shown, i.e., a case in which there is no amplitude tapering). Taken together, the four curves form a continuum of responses in frequency so that all signals will be received; yet signals at closely spaced frequencies will be separated and will appear at different outputs.

Figure 5:
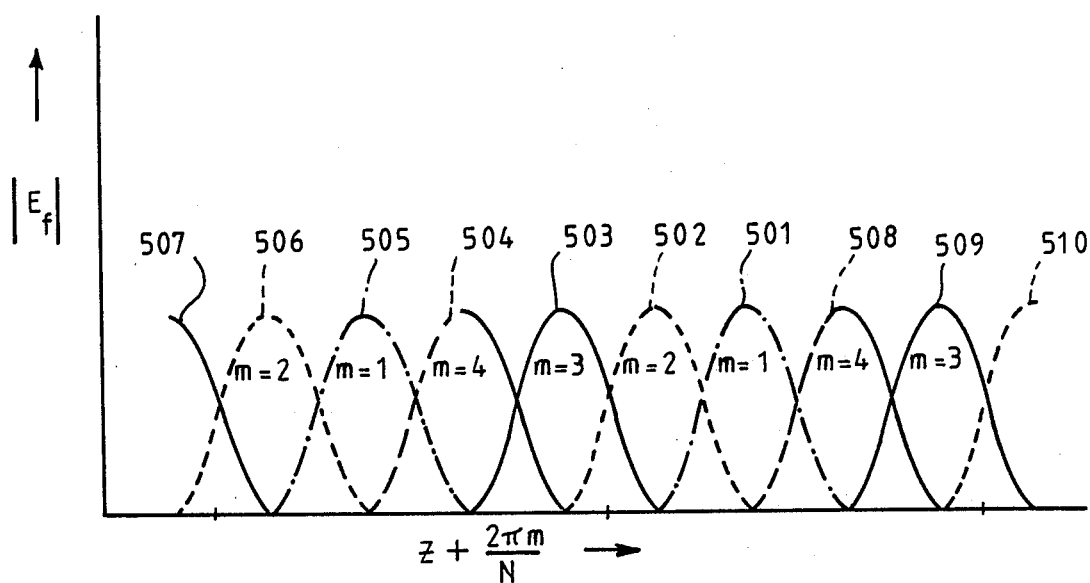
FIG. 5 is a set of superimposed graphs illustrating the frequency responses of all of the outputs of the present invention in a particular application.
Figure 6:
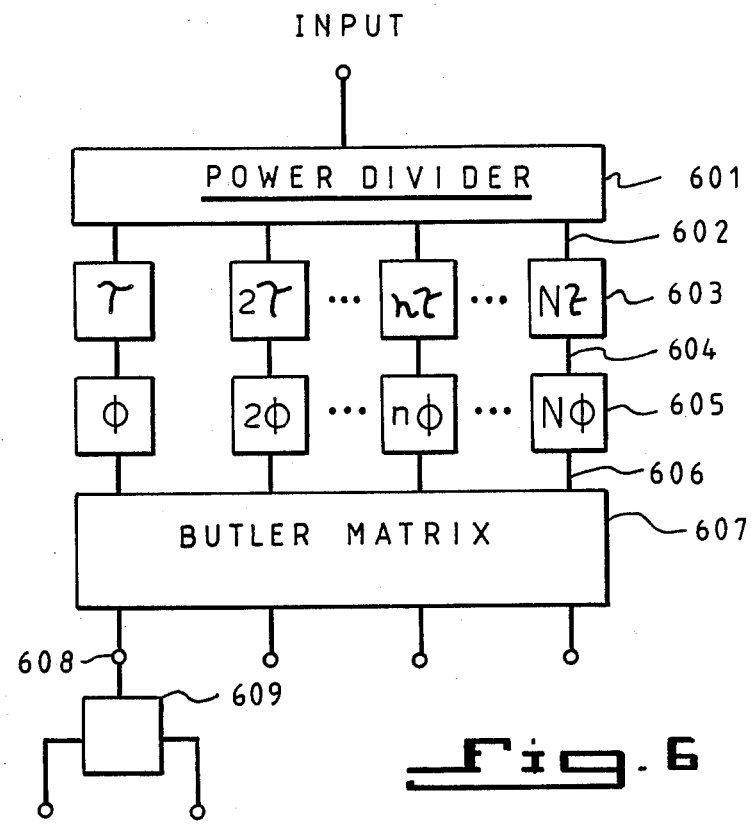
FIG. 6 is a diagram of a multiplexer/demultiplexer of the present invention augmented for application to a case where the number of channels is non-binary.

The grating lobe responses shown in FIGS. 4 and 5 (for example 401, 505) illustrate the periodic nature of the pass-band characteristics of the current invention. In effect, the demultiplexer folds the input signal spectrum into bands $N\Delta f$ wide so that signals spread within a band many times $N\Delta f$ wide may be passed by the multiplexer. Particularly, a signal B will be output at the same port as a signal A if the signal B is $KN\Delta f$ higher or lower in frequency than signal A, where K is any integer. This property may be used to advantage to restrict the order (number of inputs or outputs) of the Butler matrix 307 to a binary number and thus simplify its design and construction even when the number of channels required is non-binary. An example of how this is accomplished is shown in FIG. 6. This figure is a block diagram of the current invention augmented by the addition of a prior-art diplexer 609 at one of the output ports 608 of the Butler matrix 607. The diplexer may be of simple low-loss design since its two output channels are separated by a wide guardband of width $(N-1)\Delta f$. The Butler matrix is of binary order, N, yet the number of contiguous channels available as separate outputs is $N \times 1$. The same type of approach may be extended to a case where the number of contiguous channels available as separate outputs is a large binary number. In this case every output of the Butler matrix in the present invention is augmented by the addition of a diplexer. This permits the Butler matrix order to be ½ the number of required channels.

Figure 7:
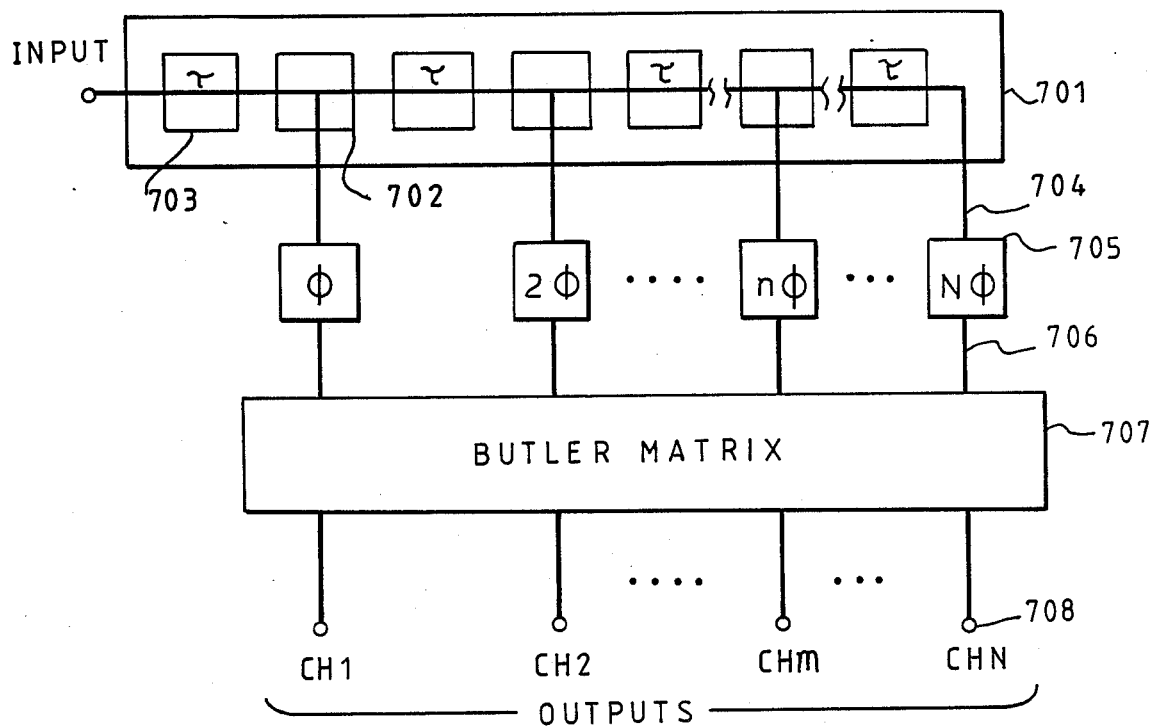
FIG. 7 is a diagram of a multiplexer/demultiplexer illustrating a second embodiment of the present invention.

Alternative equivalent structures are considered within the scope of this invention. One sample is shown in FIG. 7. In this case, a tapped delay line 701 which is a cascade of unequal binary splits 702 alternating with non-dispersive delay lines 703, provides the N delayed signal samples, $e_{nD}$ for application to the fixed phase shifters 705, and thence to the Butler matrix 707 via sets of equal length transmission lines 704 and 706. As a result of the cascading, the delays experienced by a signal propagating along the tapped delay line 701 are cumulative so that each of the individual delay lines 703 in the cascade can be made equal in delay value. In other respects, the structure of FIG. 7 performs in a similar manner to that of FIG. 3.

All of the alternative equivalent structures have in common the essence of the invention: that is, means for forming a multiplicity of samples of an input signal; means for non-dispersively differentially delaying the samples in accordance with an arithmetic progression; means for adding fixed phase shifts to samples in accordance with another arithmetic progression; and means for coherently combining the samples selectively at different output ports for different input signal frequencies.

While the apparatus in accordance with the present invention has been described as a demultiplexer, it is apparent that the same apparatus may be used as a multiplexer as well. In this case, the power divider would be a power combiner having N input ports and an output port.

Obviously many more modifications and variations of the present invention are possible in light of the above teachings. It is, therefore, to be understood that within the scope of the appended claims, the invention may be practiced otherwise than as specifically described.

What is claimed is:

1. An apparatus for separating a plurality of contiguous frequency channels of an input signal comprising:
   (a) signal dividing means for forming a plurality of samples of said input signal, each of said samples being designated in numerical order;
   (b) delaying means coupled to said signal dividing means for non-dispersively, differentially delaying each of said samples in accordance with a first arithmetic progression;
   (c) phase shifting means coupled to said delaying means for phase shifting each of said samples in accordance with a linear function of only one variable, said variable being a number designating said sample; and
   (d) combining means coupled to said phase shifting means for combining approximately in-phase samples, said combined samples forming an output signal.

2. An apparatus as in claim 1, wherein:
   (a) said signal dividing means divides said input signal into N equiphase samples, each of said samples being expressed as $$e_n = A_n \cos \omega t$$

where n is any sample,
   A is a constant,
   $\omega$ is a radian frequency, and
   t is time;
   (b) said delaying means delays each said sample by a delay $T_n$ relative to other said samples, said first arithmetic progression being expressed as:

$$T_n = (n - \bar{n})\left(\frac{1}{N\Delta f}\right)$$

where $\bar{n} = (N+1)/2$, and $\Delta f$ represents a bandwidth for separating each frequency channel output from said apparatus,
   said first arithmetic progression providing a first phase shift of each said sample relative to each other said sample, said first phase shift varying linearly with frequency at a progressively increasing slope from first of said samples to last of said samples, said first phase shift being expressed as $$\phi_{Dn} = -(n - \bar{n})\left(\frac{\omega}{N\Delta f}\right);$$

(c) said phase shifting means provides a second phase shift to each said sample relative to other said samples, said second arithmetic progression being expressed as $$\phi_{pn} = C(n - \bar{n})\frac{2\pi}{N}$$

where C is the fractional part of numerical quantity $(\bar{n} + f_1/\Delta f)$ and $f_1$ is the center frequency of the lowest frequency channel of said input signal; and
   (d) said combining means divides an nth said sample into N equal parts, provides a third phase shift to each of said N equal parts, and combines each of said N equal parts with corresponding parts from each other sample for forming a sum $e_m$, where m is any output of said combining means, said third phase shift being expressed as:

$$\phi_{nm} = (n - \bar{n})(m - \bar{n})\frac{2\pi}{N}$$

and said sum $e_m$ being expressed as $$e_m = \frac{1}{\sqrt{N}} \sum_{n=1}^{n=N} A_n \cos\left\{\omega t - (n - \bar{n})\left[\frac{\omega}{N\Delta f} - \frac{2\pi}{N}(C + m - \bar{n})\right]\right\}.$$

3. An apparatus as in claim 2 wherein said signal dividing means includes a power divider.

4. An apparatus as in claim 3 wherein said power divider includes an input port and a plurality of output ports, said plurality of output ports being at least equal in quantity to said plurality of samples, each said output port being designated as a number in arithmetic progression.

5. An apparatus as in claim 2 wherein said delaying means includes a plurality of delay lines, an nth delayed sample being expressed as $$e_{nD} = A_n \cos\left[\omega t - (n - \bar{n})\left(\frac{\omega}{N\Delta f}\right)\right].$$

6. An apparatus as in claim 5 wherein said plurality of delay lines is at least equal in quantity to said plurality of samples, each delay line being designated by a number in arithmetic progression, each said number further designating an output port of said signal dividing means, each delay line being coupled to an output port, each said coupled delay line and output port being designated by the same said number, and the delay of each delay line includes a common difference in delay relative to each succeeding delay line, said common difference in delay being equal to a reciprocal of the product of the plurality of said samples multiplied by said bandwidth for separating each frequency channel output from said apparatus.

7. An apparatus as in claim 2 wherein said phase shifting means includes a plurality of phase shift networks, an nth delayed and phase shifted sample bieng expressed as $$e_{np} = A_n \cos\left[\omega t - (n - \bar{n})\left(\frac{\omega}{N\Delta f} - \frac{2\pi C}{N}\right)\right].$$

8. An apparatus as in claim 7 wherein said plurality of phase shift networks is at least equal in quantity to said plurality of samples, each phase shift network being designated by a number in arithmetic progression, each said number further designating an output of said delaying means, each phase shift network being coupled to an output of said delaying means, each said coupled phase shift network and output of said delaying means being designated by the same said number.

9. An apparatus as in claim 2 wherein said combining means comprises a Butler matrix.

10. An apparatus as in claim 9 wherein said Butler matrix includes a plurality of input ports, said plurality of input ports being at least equal in quantity to said plurality of samples, each input port being coupled to an outport port of said phase shifting means, said Butler matrix having a plurality of output ports being at least equal in quantity to said plurality of input ports, and said Butler matrix combines said samples at different output ports of said Butler matrix for achieving constructive nearly in-phase addition of samples, and for achieving destructive nearly out-of-phase addition of samples, said constructive nearly in-phase addition of samples forming an output signal.

11. A multiplexer/demultiplexer comprising: means for performing at least one of a multiplex operation or demultiplex operation, said means for performing a demultiplex operation including:

(a) signal dividing means for forming a plurality of samples of an input signal, said signal dividing means dividing said input signal into N equiphase samples, each of said samples being expressed as $$e_n = A_n \cos \omega t$$

where n is any sample,
A is a constant,
$\omega$ is a radian frequency, and
t is time;

(b) delaying means coupled to said signal dividing means for non-dispersively, differentially delaying each of said samples in accordance with a first arithmetic progression, said delaying means delaying each said sample by a delay $T_n$ relative to other said samples, said first arithmetic progression being expressed as:

$$T_n = (n - \bar{n})\left(\frac{1}{N\Delta f}\right)$$

where $\bar{n} = (N+1)/2$, and $\Delta f$ represents a bandwidth for separating each frequency channel output from said apparatus, said first arithmetic progression providing a first phase shift of each said sample relative to each other said sample, said first phase shift varying linearly with frequency at a progressively increasing slope from first of said samples to last of said samples, said first phase shift being expressed as $$\phi_{Dn} = -(n - \bar{n})\left(\frac{\omega}{N\Delta f}\right);$$

(c) phase shifting means coupled to said delaying means for phase shifting each of said samples in accordance with a second arithmetic progression, said phase shifting means providing a second phase shift to each said sample relative to other said samples, said second arithmetic progression being expressed as $$\phi_{pn} = C(n - \bar{n})\frac{2\pi}{N}$$

where C is the fractional part of numerical quantity $(\bar{n} + f_1/\Delta f)$ and $f_1$ is the center frequency of the lowest frequency channel of said input signal; and (d) combining means coupled to said phase shifting means for combining approximately in-phase samples, said combined samples forming an output signal, said combining means dividing an nth said sample into N equal parts, providing a third phase shift to each of said N equal parts, and combining each of said N equal parts with corresponding parts from each other sample for forming a sum $e_m$ where m is any output of said combining means, said third phase shift being expressed as:

$$\phi_{nm} = (n - \bar{n})(m - \bar{n})\frac{2\pi}{N}$$

and said sum $e_m$ being expressed as $$e_m = \frac{1}{\sqrt{N}} \sum_{n=1}^{n=N} A_n \cos\left\{\omega t - (n - \bar{n})\left[\frac{\omega}{N\Delta f} - \frac{2\pi}{N}(C + m - \bar{n})\right]\right\};$$

and said means for performing a multiplex operation including said signal dividing means, said delaying means, said phase shifting means, and said combining means, whereby said signal dividing means, said delaying means, said phase shifting means, and said combining means are coupled as in a demultiplex operation and perform in a reciprocal manner of said demultiplex operation.

12. A multiplexer/demultiplexer as in claim 11 wherein:
  (a) said signal dividing means includes a power divider in said demultiplex operation, said power divider being a power combiner in said multiplex operation, said power divider having an input port and a plurality of output ports, said plurality of output ports being at least equal in quantity to said plurality of samples, each said output port being designated as a number in arithmetic progression:
  (b) said delaying means includes a plurality of delay lines, an nth delayed sample being expressed as $$e_{nD} = A_n \cos\left[\omega t - (n - \bar{n})\left(\frac{\omega}{N\Delta f}\right)\right],$$

said plurality of delay lines being at least equal in quantity to said plurality of samples, each delay line being designated by a number in arithmetic progression, each said number further designating an output port of said signal dividing means, each delay line being coupled to an output port, each said coupled delay line and output port being designated by the same said number, and the delay of each delay line includes a common difference in delay relative to each succeeding delay line, said common difference in delay being equal to a reciprocal of the product of the plurality of said samples multiplied by said bandwidth for separating each frequency channel output from said apparatus;
  (c) said phase shifting means includes a plurality of phase shift networks, an nth delayed and phase shifted sample being expressed as $$e_{np} = A_n \cos\left[\omega t - (n - \bar{n})\left(\frac{\omega}{N\Delta f} - \frac{2\pi C}{N}\right)\right],$$

said plurality of phase shift networks being at least equal in quantity to said plurality of samples, each phase shift network being designated by a number in arithmetic progression, each said number further designating an output of said delaying means, each phase shift network being coupled to an output of said delaying means, each said coupled phase shift network and output of said delaying means being designated by the same said number; and
  (d) said combining means includes a Butler matrix, said Butler matrix having a plurality of input ports, said plurality of input ports being at least equal in quantity to said plurality of samples, each input port being coupled to an output port of said phase shifting means, said Butler matrix having a plurality of output ports being at least equal in quantity to said plurality of input ports, and said Butler matrix combines said samples at different output ports of said Butler matrix for achieving constructive nearly in-phase addition of samples, and for achieving destructive nearly out-of-phase addition of samples, said constructive nearly in-phase addition of samples forming an output signal.

* * * * *